United States Patent
Lee et al.

(10) Patent No.: US 10,120,234 B2
(45) Date of Patent: Nov. 6, 2018

(54) LIQUID CRYSTAL DISPLAY APPARATUS

(71) Applicant: Samsung Display Co., LTD., Yongin, Gyeonggi-Do (KR)

(72) Inventors: Jeongho Lee, Yongin (KR); Hyangyul Kim, Yongin (KR); Soojung Chae, Yongin (KR); Junho Song, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 282 days.

(21) Appl. No.: 14/707,372

(22) Filed: May 8, 2015

(65) Prior Publication Data

US 2016/0161798 A1    Jun. 9, 2016

(30) Foreign Application Priority Data

Dec. 8, 2014 (KR) .................. 10-2014-0175383

(51) Int. Cl.
    *G02F 1/1335*    (2006.01)
    *F21V 8/00*    (2006.01)
    *G02B 5/30*    (2006.01)
    *G02F 1/1337*    (2006.01)

(52) U.S. Cl.
    CPC ..... *G02F 1/133528* (2013.01); *G02B 5/3058* (2013.01); *G02B 6/0065* (2013.01); *G02F 1/133512* (2013.01); *G02F 1/133514* (2013.01); *G02F 1/133707* (2013.01); *G02F 2001/133531* (2013.01); *G02F 2001/133548* (2013.01)

(58) Field of Classification Search
    None
    See application file for complete search history.

(56) References Cited

U.S. PATENT DOCUMENTS

| 2002/0033923 A1* | 3/2002 | Shimoshikiryou ... G02F 1/1393 349/141 |
| 2006/0125986 A1* | 6/2006 | Choo ................. G02F 1/133555 349/114 |
| 2009/0046362 A1* | 2/2009 | Guo ........................ B82Y 40/00 359/485.05 |
| 2009/0097273 A1* | 4/2009 | Chang .................. G02B 6/0055 362/618 |

(Continued)

FOREIGN PATENT DOCUMENTS

| KR | 1020060090420 A | 8/2006 |
| KR | 1020120124222 A | 11/2012 |

(Continued)

OTHER PUBLICATIONS

Song et al., "LTPS-based Transparent AM OLED," SID 10 Digest, pp. 144-147, 2010.*

*Primary Examiner* — Ryan Crockett

(74) *Attorney, Agent, or Firm* — H.C. Park & Associates, PLC

(57) ABSTRACT

A liquid crystal display apparatus includes a first substrate partitioned into a first region which displays an image and a second region through which external light passes, a second substrate facing the first substrate, a liquid crystal layer between the first substrate and the second substrate, a first polarizer on one side of the first substrate, and a second polarizer on one side of the second substrate, wherein at least one of the first polarizer and the second polarizer includes an opening positioned in the second region.

11 Claims, 6 Drawing Sheets

(56) References Cited

U.S. PATENT DOCUMENTS

| | | | | |
|---|---|---|---|---|
| 2009/0153781 A1* | 6/2009 | Otani | G02B 5/3016 | 349/74 |
| 2010/0117991 A1* | 5/2010 | Koyama | G02F 1/13338 | 345/175 |
| 2010/0165267 A1* | 7/2010 | Yoshida | G02F 1/13318 | 349/106 |
| 2011/0134255 A1* | 6/2011 | Kim | G06F 1/1686 | 348/207.1 |
| 2012/0280259 A1* | 11/2012 | Hatta | H01L 27/3213 | 257/89 |
| 2012/0280894 A1* | 11/2012 | Park | H01L 51/5281 | 345/77 |
| 2014/0098327 A1* | 4/2014 | Chen | G02B 5/3025 | 349/96 |
| 2014/0098330 A1* | 4/2014 | Nam | G02B 5/201 | 349/96 |
| 2014/0104527 A1* | 4/2014 | Yang | H01L 27/1225 | 349/43 |
| 2014/0158411 A1 | 6/2014 | Ryu et al. | | |
| 2014/0292839 A1* | 10/2014 | Huang | G02F 1/133533 | 345/694 |
| 2015/0042928 A1* | 2/2015 | Won | G02F 1/133377 | 349/96 |
| 2016/0139462 A1* | 5/2016 | Park | G02F 1/133528 | 349/96 |
| 2016/0170261 A1* | 6/2016 | Nam | G02F 1/133528 | 257/72 |
| 2016/0216542 A1* | 7/2016 | Yoshida | G02F 1/133528 | |

FOREIGN PATENT DOCUMENTS

| | | |
|---|---|---|
| KR | 1020140069771 A | 6/2014 |
| KR | 1020140076268 A | 6/2014 |
| KR | 1020140079688 A | 6/2014 |

* cited by examiner

LIQUID CRYSTAL DISPLAY APPARATUS

CLAIM OF PRIORITY

This application claims the priority and all the benefits accruing under 35 U.S.C. § 119 of Korean Patent Application No. 10-2014-0175383, filed on Dec. 8, 2014, in the Korean Intellectual Property Office (KIPO), the disclosure of which is incorporated herein in its entirety by reference.

BACKGROUND OF THE INVENTION

Field of the Invention

One or more exemplary embodiments relate to a liquid crystal display apparatus, and more particularly, to a see-through liquid crystal display apparatus that allows a viewer to recognize not only an image displayed on a display apparatus but also an external background surrounding the display apparatus.

Description of the Related Art

As various kinds of electronic devices such as cell phones, personal digital assistants (PDAs), and large-sized televisions (TVs) have been developed, demands for flat panel displays that may be applied to such electronic devices have increased. Liquid crystal displays (LCDs), a representative example of flat panel displays, have excellent features such as low power consumption and high contrast ratio and can easily display displaying moving images.

Such an LCD includes a liquid crystal layer between two substrates. The LCD applies an electric field to the liquid crystal layer and thus a direction in which liquid crystal molecules are arranged is changed, thereby allowing a transmittance difference to be perceived on a screen.

Recently, research on see-through LCDs capable of allowing a viewer to recognize not only images that are displayed by LCDs but also external backgrounds surrounding the displaying LCDs has been conducted.

SUMMARY OF THE INVENTION

However, such a liquid crystal display apparatus of related art has a problem that a transmittance of external light decreases due to polarizers that are placed on both sides of a display panel.

One or more exemplary embodiments include a see-through liquid crystal display apparatus having an improved transmittance.

Additional aspects will be set forth in part in the description which follows and, in part, will be apparent from the description, or may be learned by practice of the presented embodiments.

According to one or more exemplary embodiments, a liquid crystal display apparatus includes a first substrate partitioned into a first region which displays an image and a second region through which external light passes; a second substrate facing the first substrate; a liquid crystal layer between the first substrate and the second substrate; a first polarizer on one side of the first substrate; and a second polarizer on one side of the second substrate, wherein at least one of the first polarizer and the second polarizer includes an opening positioned in the second region.

The at least one of the first polarizer and the second polarizer that includes the opening may be a wire-grid polarizer (WGP).

The first polarizer may be between the first substrate and the liquid crystal layer, and may include the opening.

The second polarizer may be on the opposite of a side of the second substrate that faces the first substrate to correspond to the first region and the second region.

The first polarizer and the second polarizer may have polarization axes substantially perpendicular to each other.

The apparatus may further include a color filter between the first substrate and the liquid crystal layer and configured to assign a predetermined color to incident light, and a black matrix partitioning the color filter, wherein the color filter and the black matrix may not be in the second region.

The first region and the second region may alternate in a first direction, and the first region may include a first sub-pixel, a second sub-pixel, and a third sub-pixel emitting light of different colors and arranged in a second direction substantially perpendicular to the first direction.

The apparatus may further include a first electrode and a second electrode which generate an electric field in the liquid crystal layer, wherein at least one of the first electrode and the second electrode may not be in the second region.

The second electrode may be in at least the first region on the first substrate, and the first electrode may have a form of slits in the first region on the second electrode.

The first electrode may be in the first region on the first substrate, and the second electrode may be in at least the first region on a surface that faces the first substrate of the second substrate.

The apparatus may further include a light guiding plate on the opposite surface of a surface that faces the second substrate of the first substrate, and a light source configured to supply light to the light guiding plate.

The light source may face a side surface of the light guiding plate, and the light guiding plate may include a material capable of transmitting light.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, where in.

DETAILED DESCRIPTION OF THE INVENTION

Figure 1:
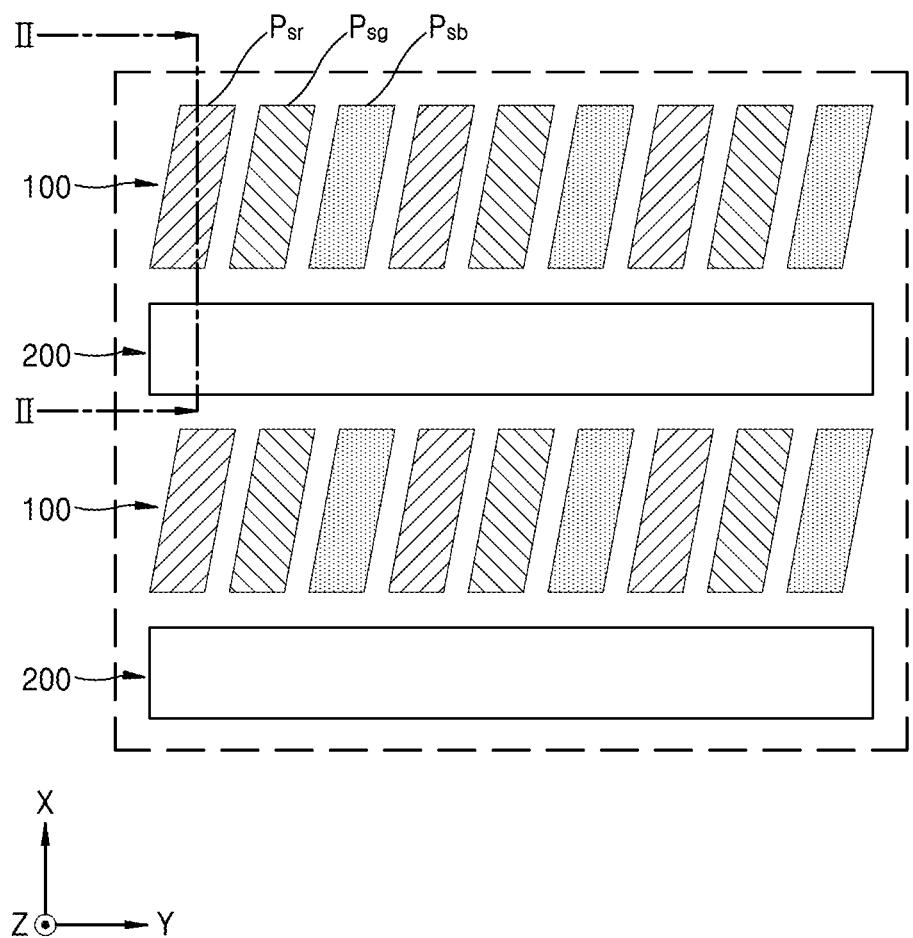
FIG. 1 is a schematic plan view of a liquid crystal display apparatus according to an embodiment.

As the inventive concept allows for various changes and numerous embodiments, exemplary embodiments will be illustrated in the drawings and described in detail in the written description. The effect and feature of the inventive concept and methods of accomplishing the same will become apparent from the following description of the exemplary embodiments in detail, taken in conjunction with the accompanying drawings. The inventive concept may, however, be embodied in many different forms and should not be construed as limited to the exemplary embodiments set forth herein.

While such terms as "first" and "second" may be used to describe various components, such components must not be limited to the above terms. The above terms are used only to distinguish one component from another.

As used herein, the singular forms "a," "an," and "the" are intended to include the plural forms as well, unless the context clearly indicates otherwise.

It will be understood that the terms such as "include," "comprise," and "have" used herein specify the presence of stated features or components, but do not preclude the presence or addition of one or more other features or components.

It will be further understood that when a layer, region, or component is referred to as being "formed on" another layer, region, or component, it can be directly or indirectly formed on the other layer, region, or component. That is, for example, intervening layers, regions, or components may be present.

In the following examples, the x-axis and the y-axis are not limited to two axes that are perpendicular to each other and may be interpreted in a broader sense. For example, the x-axis and the y-axis may represent different directions that are not perpendicular to each other.

Sizes of components in the drawings may be exaggerated for convenience of explanation. In other words, since sizes and thicknesses of components in the drawings are arbitrarily illustrated for convenience of explanation, the following exemplary embodiments are not limited thereto.

Reference will now be made in detail to exemplary embodiments, examples of which are illustrated in the accompanying drawings. Like reference numerals denote like elements throughout, and thus a repeated description thereof will be omitted. Expressions such as "at least one of," when preceding a list of elements, modify the entire list of elements and do not modify the individual elements of the list.

Figure 2:
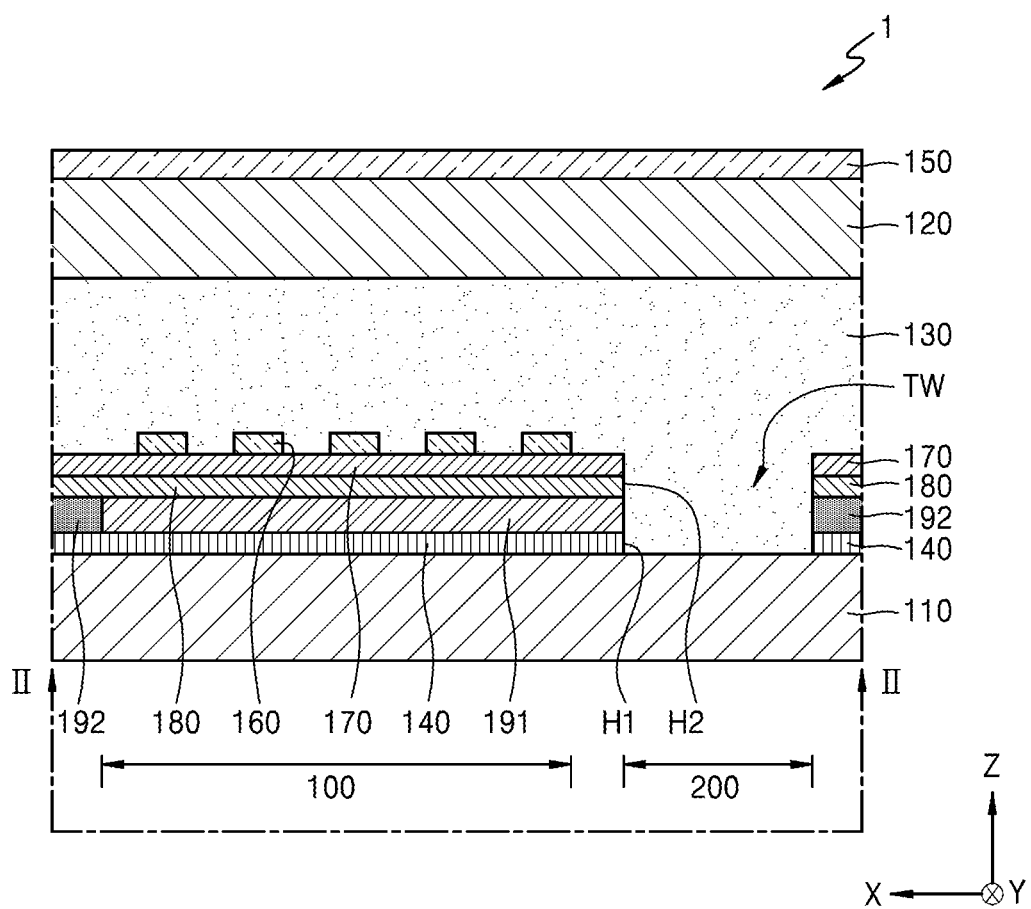
FIG. 2 is a cross-sectional view of the liquid crystal display apparatus taken along line II-II of FIG. 1.

FIG. 1 is a schematic plan view of a liquid crystal display apparatus 1 according to an embodiment, and FIG. 2 is a cross-sectional view of the liquid crystal display apparatus 1 taken along line II-II of FIG. 1.

Referring to FIGS. 1 and 2, the liquid crystal display apparatus 1 may include a first substrate 110 partitioned into a first region 100 which displays an image and a second region 200 through which external light passes, a second substrate 120 facing the first substrate 110, a liquid crystal layer 130 positioned between the first substrate 110 and the second substrate 120, a first polarizer 140 placed on one side of the first substrate 110, and a second polarizer 150 placed on one side of the second substrate 120.

The first substrate 110 and the second substrate 120 may be transparent substrates formed of glass, plastic, or the like, and the liquid crystal display apparatus 1 may be a see-through liquid crystal display apparatus where a user may see not only an image displayed by the liquid crystal display apparatus 1 but also an external background image through the liquid crystal display apparatus 1.

The first region 100 and the second region 200 may alternate in a first direction X. The first region 100 may include a first sub-pixel Psr, a second sub-pixel Psg, and a third sub-pixel Psb emitting light of different colors and arranged in a second direction Y which is substantially perpendicular to the first direction X. Although the first sub-pixel Psr, the second sub-pixel Psg, and the third sub-pixel Psb may respectively emit red light, green light, and blue light, the present embodiment is not limited thereto. The colors may be assigned by a color filter 191 or a color conversion layer disposed to correspond to each of the sub-pixels Psr, Psg, and Psb, and each of the sub-pixels Psr, Psg, and Psb may be partitioned by a black matrix 192.

The second region 200 may be positioned between the first region 100 positioned in a row and the first region 100 positioned in another row. The color filter 191 and the black matrix 192 may not be placed in the second region 200. The second region 200 does not display an image and just serves as a transmission window TW for transmitting external light as it is. A transparency of the whole liquid crystal display apparatus 1 may be improved by disposing the second region 200 having a high transmittance.

The first polarizer 140 may be placed between the first substrate 110 and the liquid crystal layer 130, and may include an opening H1 positioned in the second region 200. That is, the first polarizer 140 may be placed only in the first region 100.

The second region 200 is a region where no image is displayed, and a light transmittance of the second region 200 may be improved by reducing the number of elements placed in the second region 200. Specifically, since a polarizer transmits only a light component of incident light that is in a predetermined direction (that is, a polarization axis), the polarizer may be an optical device having a high absorptance. According to an embodiment, the first polarizer 140 is not placed in the second region 200, and therefore a transmittance of the second region 200 may be improved.

The first polarizer 140 may be a wire-grid polarizer (WGP). The WGP may include a regular array of fine metallic wires disposed in parallel. The WGP performs the same function as a general polarizer. However, the WGP does not include a oriented material and includes the metallic wires with a distance therebetween less than a wavelength of incident light. Therefore, the WGP may be easily patterned. Accordingly, forming the opening H1 may be facilitated by using the WGP as the first polarizer 140.

The color filter 191 and the black matrix 192 may be placed on the first polarizer 140. As described above, the color filter 191 may assign a color to light that is incident on the liquid crystal display apparatus 1, and the black matrix 192 may prevent color mixture and partition sub-pixels. According to an embodiment, a first electrode 160 and the color filter 191 may be easily aligned by disposing the color filter 191 and the black matrix 192 not on the second substrate 120 but on the first substrate 110. That is, in the case that the first electrode 160 is positioned on the first substrate 110 and the color filter 191 and the black matrix 192 are placed on the second substrate 120, a high degree of precision is required when the first substrate 110 and the second substrate 120 are attached to each other. However, according to the present embodiment, the color filter 191 and the black matrix 192 as well as the first electrode 160 are placed on the first substrate 110, and therefore the first electrode 160 and the color filter 191 may be easily aligned.

A second electrode 180 may be positioned on the color filter 191 and the black matrix 192. The second electrode 180 is a common electrode, which may commonly supply voltage to all the pixels included in the liquid crystal display apparatus 1. According to an embodiment, the second electrode 180 may include an opening H2 positioned in the second region 200. The second electrode 180 may be a transparent electrode.

An insulating layer 170 may be positioned on the second electrode 180, and the first electrode 160 may be positioned on the insulating layer 170. The first electrode 160 may be disposed in a form of slits. Although the first electrode 160 in the form of slits that is disposed in one sub-pixel may be electrically connected to each other, the first electrodes 160 in different sub-pixels may be electrically independent of each other. The first electrode 160 may be a transparent electrode.

Although not illustrated, the first electrode 160 may be electrically connected to a switching device (not shown). Only when the switching device (not shown) is turned on, voltage may be applied to the first electrode 160. If a voltage is applied to the first electrode 160 when voltage has been applied to the second electrode 180, an electric field is generated between the second electrode 180 and the first electrode 160, and a liquid crystal included in the liquid crystal layer 130 may be aligned by the electric field.

According to an embodiment, the second polarizer 150 may be positioned on the opposite surface of a surface that faces the first substrate 110 of the second substrate 120, and the second polarizer 150 may correspond to the first region 100 and the second region 200. The second polarizer 150 does not need patterning, and therefore a general polarizer may be used as the second polarizer 150.

According to an embodiment, the first polarizer 140 and the second polarizer 150 may have polarization axes substantially perpendicular to each other. Light having passed through the first polarizer 140 is polarized in a predetermined direction, and may pass through the second polarizer 150 after the polarization direction is rotated as much as about 90 degrees by the liquid crystal aligned in a horizontal direction due to the first electrode 160 and the second electrode 180. In the case that the liquid crystal is not aligned, light having passed through the liquid crystal layer 130 may not pass through the second polarizer 150. In this way, each of the sub-pixels Psr, Psg, and Psb may be controlled, thereby displaying a desired image.

At least one of the first electrode 160 and the second electrode 180 is not positioned in the second region 200. Therefore, in the second region 200, an electric field is not generated and thus the liquid crystal is not aligned. Since the first polarizer 140 is not placed in the second region 200, light incident from the outside may pass through the first substrate 110, the liquid crystal layer 130, the second substrate 120, and the second polarizer 150 and reach the user.

According to an embodiment, a transmittance of the liquid crystal display apparatus 1 may be improved due to the second region 200, and based on needs, an additional transmittance of the liquid crystal display apparatus 1 may be obtained due to the first region 100. That is, all of the first substrate 110, the second substrate 120, the first electrode 160, and the second electrode 180 positioned in the first region 100 are formed of transparent materials, and the color filter 191 also has a predetermined transmittance.

For example, in an environment surrounded by darkness, the second region 200 is not enough to facilitate recognizing an external background image. In this case, the liquid crystal included in the liquid crystal layer 130 may be aligned by applying a predetermined voltage to the first electrode 160 and the second electrode 180, thereby improving a transmittance of the first region 100. That is, the external background image may be observed through the first region 100 by using light leakage, thereby further improving the transmittance of the liquid crystal display apparatus 1.

As the above-described structure and operation relate to the liquid crystal display apparatus 1 according to the present embodiment, the exemplary embodiments are not limited thereto. Various configurations such as positions and forms of the first electrode 160 and the second electrode 180 and alignment of the first polarizer 140 and the second polarizer 150 may differ depending on the mode of driving the liquid crystal display apparatus 1.

Figure 3:
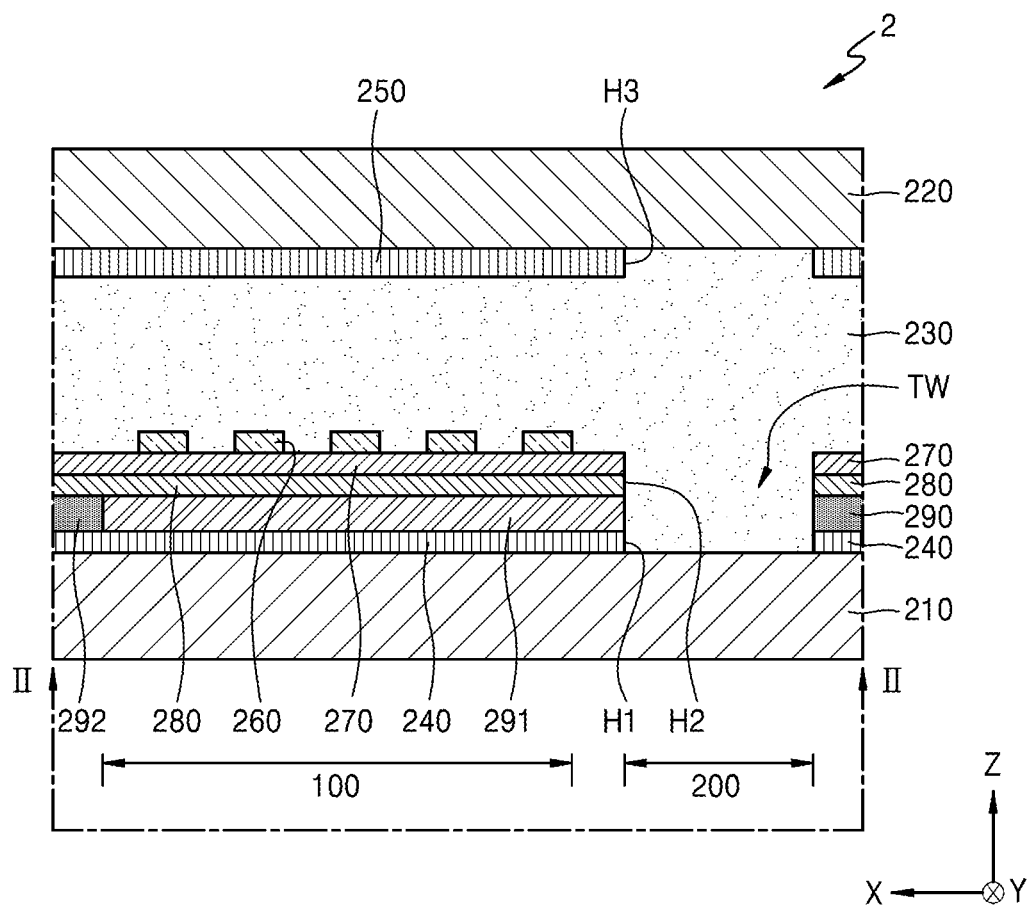
FIG. 3 is a schematic cross-sectional view of a liquid crystal display apparatus according to an embodiment.

FIG. 3 is a schematic cross-sectional view of a liquid crystal display apparatus 2 according to an embodiment.

Referring to FIG. 3, the liquid crystal display apparatus 2 may include a first substrate 210 partitioned into a first region 100 which displays an image and a second region 200 through which external light passes, a second substrate 220 facing the first substrate 210, a liquid crystal layer 230 positioned between the first substrate 210 and the second substrate 220, a first polarizer 240 placed on one side of the first substrate 210, and a second polarizer 250 placed on one side of the second substrate 220.

The first polarizer 240 and the second polarizer 250 may respectively include openings H1 and H3 positioned in the second region 200. That is, the first polarizer 240 and the second polarizer 250 may not be placed in the second region 200. Thus, a transmittance of the second region 200 may be further improved.

The first polarizer 240 may be placed between the first substrate 210 and the liquid crystal layer 230, and the second polarizer 250 may be placed on a surface that faces the first substrate 210 of the second substrate 220. WGPs may be used as the first polarizer 240 and the second polarizer 250 to facilitate patterning.

A color filter 291 and a black matrix 292 may be placed on the first polarizer 240, and a second electrode 280, an insulating layer 270, and a first electrode 260 may be positioned on the color filter 291 and the black matrix 292. Configurations of the liquid crystal display apparatus 2 except the second polarizer 250 are the same as those of the liquid crystal display apparatus 1 of FIG. 1, and therefore a repeated description thereof will be omitted.

Figure 4:
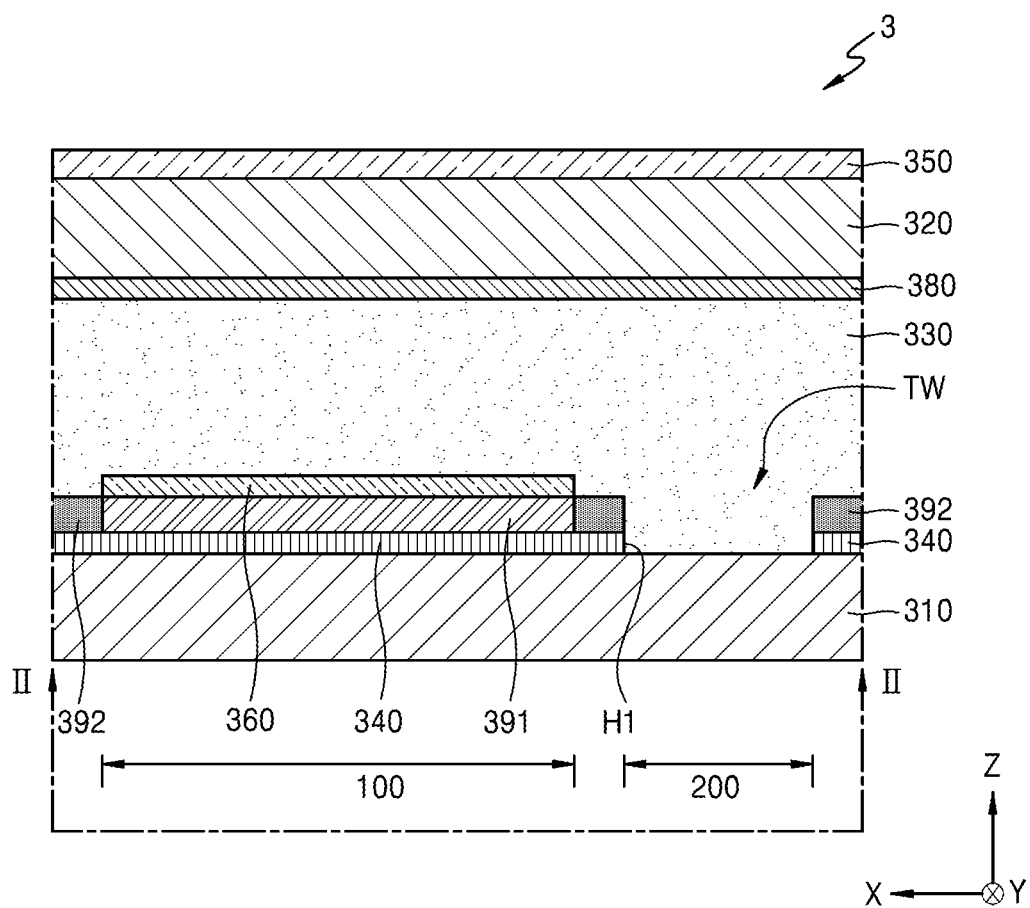
FIG. 4 is a schematic cross-sectional view of a liquid crystal display apparatus according to an embodiment.

FIG. 4 is a schematic cross-sectional view of a liquid crystal display apparatus 3 according to an embodiment.

Referring to FIG. 4, the liquid crystal display apparatus 3 may include a first substrate 310 partitioned into a first region 100 which displays an image and a second region 200 through which external light passes, a second substrate 320 facing the first substrate 310, a liquid crystal layer 330 positioned between the first substrate 310 and the second substrate 320, a first polarizer 340 placed on one side of the first substrate 310, and a second polarizer 350 placed on one side of the second substrate 320.

The first substrate 310 and the second substrate 320 may be transparent substrates, and the user may see an external background image through the second region 200 in which a color filter 391 and a black matrix 392 are not placed.

Between the first substrate 310 and the liquid crystal layer 330, the first polarizer 340 formed of the WGP or the like may be placed, and the first polarizer 340 may include an opening H1 positioned in the second region 200. That is, the first polarizer 340 may be placed only in the first region 100. The second region 200 is a region where no image is displayed, and a light transmittance of the second region 200 may be improved by reducing the number of elements placed in the second region 200.

A color filter 391 and a black matrix 392 may be placed on the first polarizer 340. The color filter 391 may be patterned to correspond to each sub-pixel, and the black matrix 392 may be placed between the color filters 391. The black matrix 392 may also be placed between the first region 100 and the second region 200.

A first electrode 360 may be positioned on the color filter 391. The first electrodes 360 in different sub-pixels may be electrically independent of each other. The first electrode 360 may be electrically connected to a switching device (not shown).

A second electrode 380 may be positioned on a surface that faces the first substrate 310 of the second substrate 320. The second electrode 380 is a common electrode, which may commonly supply voltage to all the pixels included in the liquid crystal display apparatus 3. According to an embodiment, the second electrode 380 may be a transparent electrode and may be positioned in the first region 100 and the second region 200 of the second substrate 320.

If a voltage is applied to the first electrode 360 when voltage has been applied to the second electrode 380, an electric field is generated between the second electrode 380 and the first electrode 360, and a liquid crystal included in the liquid crystal layer 330 may be aligned by the electric field. The electric field may be generated in a vertical direction unlike that in the case of the liquid crystal display apparatus 1 of FIG. 2, and the liquid crystal included in the liquid crystal layer 330 may be aligned in a vertical direction or in a spiral.

According to an embodiment, the second polarizer 350 may be placed on the opposite surface of a surface that faces the first substrate 310 of the second substrate 320. Also, the second polarizer 350 may correspond to the first region 100 and the second region 200.

According to an embodiment, the first polarizer 340 and the second polarizer 350 may have polarization axes substantially perpendicular to each other. Light having passed through the first polarizer 340 is polarized in a predetermined direction, and may pass through the second polarizer 350 after the polarization direction is rotated as much as about 90 degrees by the aligned liquid crystal. In the case that the liquid crystal is not aligned, light having passed through the liquid crystal layer 330 may not pass through the second polarizer 350. Since the first electrode 360 is not positioned in the second region 200, an electric field is not generated and thus the liquid crystal is not aligned in the second region 200. Since the first polarizer 340 is not placed in the second region 200, light incident from the outside may pass through the first substrate 310, the liquid crystal layer 330, the second electrode 380, the second substrate 320, and the second polarizer 350 and reach the user.

Figure 5:
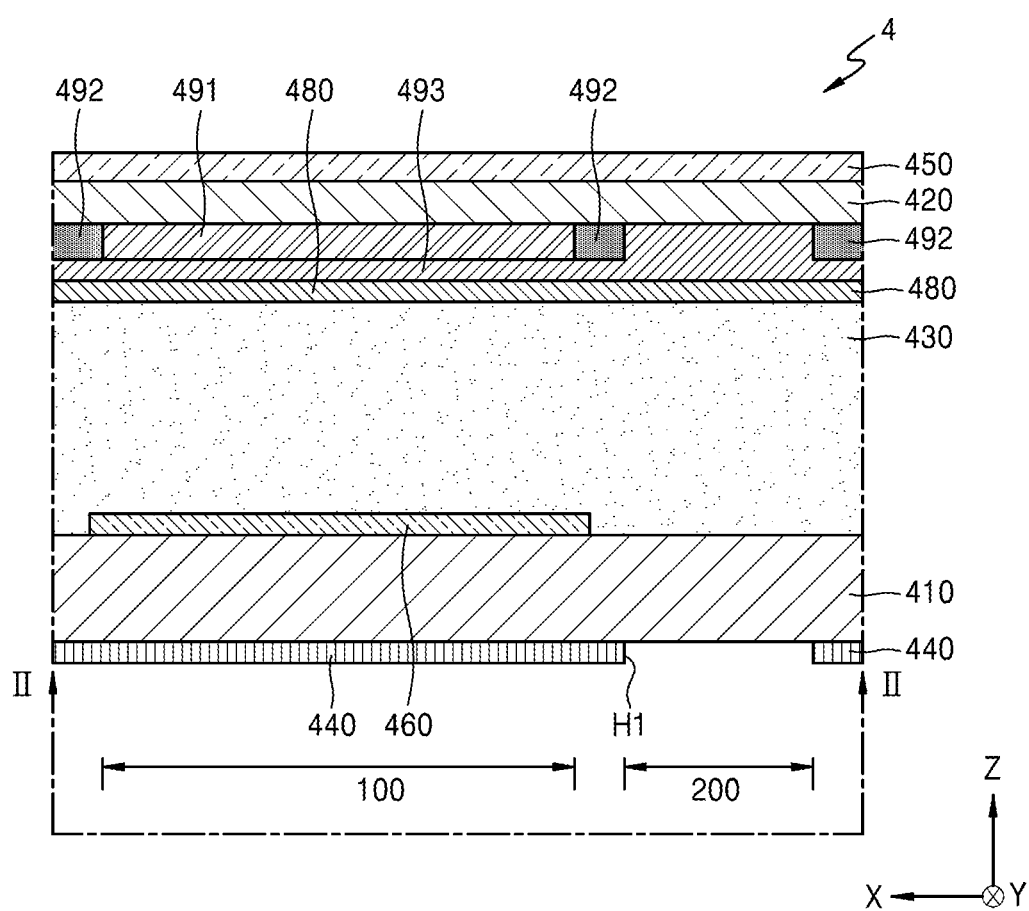
FIG. 5 is a schematic cross-sectional view of a liquid crystal display apparatus according to an embodiment.

FIG. 5 is a schematic cross-sectional view of a liquid crystal display apparatus 4 according to an embodiment.

Referring to FIG. 5, the liquid crystal display apparatus 4 may include a first substrate 410 partitioned into a first region 100 which displays an image and a second region 200 through which external light passes, a second substrate 420 facing the first substrate 410, a liquid crystal layer 430 positioned between the first substrate 410 and the second substrate 420, a first polarizer 440 placed on one side of the first substrate 410, and a second polarizer 450 placed on one side of the second substrate 420.

The first substrate 410 and the second substrate 420 may be transparent substrates, and the user may see an external background image through the second region 200 in which a color filter 491 and a black matrix 492 are not placed.

On the opposite surface of a surface that faces the second substrate 420 of the first substrate 410, the first polarizer 440 formed of a WGP or the like may be placed, and the first polarizer 440 may include an opening H1 positioned in the second region 200. That is, the first polarizer 440 may be placed only in the first region 100. The second region 200 is a region where no image is displayed, and a light transmittance of the second region 200 may be improved by reducing the number of elements placed in the second region 200.

A first electrode 460 may be positioned on the surface of the first substrate 410 that faces the second substrate 420. The first electrodes 460 in different sub-pixels may be electrically independent of each other. The first electrode 460 may be electrically connected to a switching device (not shown).

A color filter 491 and a black matrix 492 may be placed on a surface of the second substrate 420 that faces the first substrate 410. The color filter 491 may be patterned to correspond to each sub-pixel, and the black matrix 492 may be placed between the color filters 491. The black matrix 492 may also be placed between the first region 100 and the second region 200.

An overcoat layer 493 may be positioned on the second substrate 420 to cover the color filter 491 and the black matrix 492, and a second electrode 480 may be positioned on the overcoat layer 493. The second electrode 480 is a common electrode, which may commonly supply voltage to all the pixels included in the liquid crystal display apparatus 4. According to an embodiment, the second electrode 480 may be a transparent electrode and may be positioned in the first region 100 and the second region 200 of the second substrate 420.

If a voltage is applied to the first electrode 460 when voltage has been applied to the second electrode 480, an electric field is generated between the second electrode 480 and the first electrode 460, and a liquid crystal included in the liquid crystal layer 430 may be aligned by the electric field. The electric field may be generated in a vertical direction unlike that in the case of the liquid crystal display apparatus 1 of FIG. 2, and the liquid crystal included in the liquid crystal layer 430 may be aligned in a vertical direction or in a spiral.

According to an embodiment, on the opposite surface of the surface that faces the first substrate 410 of the second substrate 420, the second polarizer 450 may be placed, and the second polarizer 450 may correspond to the first region 100 and the second region 200.

According to an embodiment, the first polarizer 440 and the second polarizer 450 may have polarization axes substantially perpendicular to each other. Light having passed through the first polarizer 440 is polarized in a predetermined direction, and may pass through the second polarizer 450 after the polarization direction is rotated as much as about 90 degrees by the aligned liquid crystal. In the case that the liquid crystal is not aligned, light having passed through the liquid crystal layer 430 may not pass through the second polarizer 450. Since the first electrode 460 is not positioned in the second region 200, an electric field is not generated and thus the liquid crystal is not aligned in the second region 200. Since the first polarizer 440 is not placed in the second region 200, light incident from the outside may pass through the first substrate 410, the liquid crystal layer 430, the second electrode 480, the second substrate 420, and the second polarizer 450 and reach the user.

Figure 6:
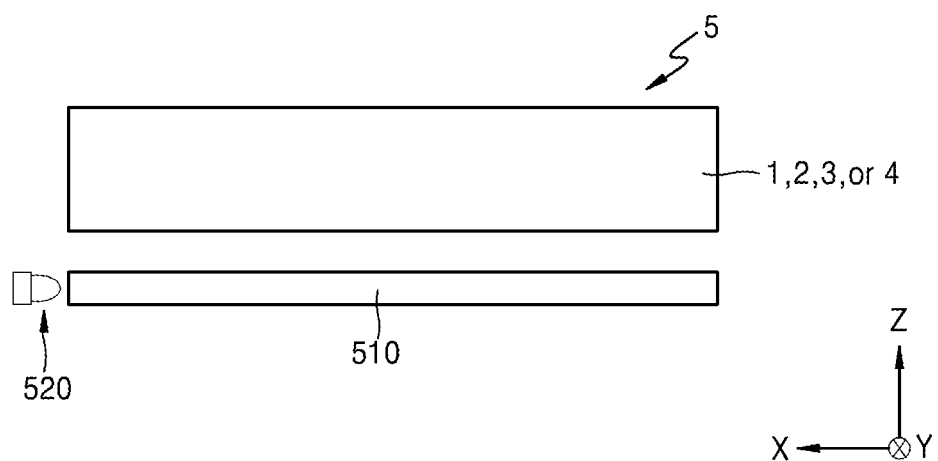
FIG. 6 is a schematic cross-sectional view of a liquid crystal display apparatus according to an embodiment.

FIG. 6 is a schematic cross-sectional view of a liquid crystal display apparatus 5 according to an embodiment.

Referring to FIG. 6, the liquid crystal display apparatus 5 may further include a light guiding plate 510 which is placed on the opposite surface of a surface that faces a second substrate 120, 220, 320, or 420 of a first substrate 110, 210, 310, or 410 included in a liquid crystal display apparatus 1, 2, 3, or 4 according to the above embodiments, and a light source 520 which supplies light to the light guiding plate 510.

The light source 520 may face a side surface of the light guiding plate 510, and the light guiding plate 510 may be formed of a material that is capable of transmitting light. The light source 520 may be formed of a light-emitting diode (LED) or the like and may emit white light. However, the exemplary embodiments are not limited thereto. In the case that the liquid crystal display apparatus 5 includes a color conversion layer formed of a fluorescent substance instead of a color filter, the light source 520 may emit blue light.

Light that is emitted by the light source 520 may be incident on the light guiding plate 510, and light that is made uniform over a large area by the light guiding plate 510 may be irradiated on the first substrate 110, 210, 310, or 410. According to necessity, such as when ambient light is excessively weak, the light source 520 may be turned on, thereby displaying an image from the liquid crystal display apparatus 5.

As described above, according to one or more of the above exemplary embodiments, a see-through liquid crystal display apparatus having an improved transmittance may be configured. However, the scope of the inventive concept is not limited by such an effect.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A liquid crystal display apparatus comprising:
   a first substrate partitioned into a first region which displays an image and a second region through which external light passes;
   a second substrate facing the first substrate;
   a liquid crystal layer disposed between the first substrate and the second substrate;
   a first polarizer disposed on one side of the first substrate;
   a second polarizer disposed on one side of the second substrate, wherein at least one selected from the first polarizer and the second polarizer comprises an opening positioned in the second region, none of the first and second polarizers covering the second region;
   a color filter disposed between the first substrate and the liquid crystal layer and configured to assign a predetermined color to incident light;
   a black matrix partitioning the color filter,
   a first electrode disposed on the first substrate;
   a second electrode disposed between the first electrode and the first substrate,
   wherein the color filter and the black matrix are not in the second region and the color filter and the black matrix are disposed between the second electrode and the first polarizer; and
   wherein the first polarizer is disposed between the first substrate and the color filter, the first polarizer is disposed between the first substrate and the black matrix, and the second polarizer is disposed between the second substrate and the liquid crystal layer.

2. The apparatus of claim 1, wherein the at least one selected from the first polarizer and the second polarizer that comprises the opening is a wire-grid polarizer (WGP).

3. The apparatus of claim 1, wherein the first polarizer is between the first substrate and the liquid crystal layer and comprises the opening.

4. The apparatus of claim 3, wherein the second polarizer is on an opposite side of a side of the second substrate that faces the first substrate to correspond to the first region.

5. The apparatus of claim 1, wherein the first polarizer and the second polarizer have polarization axes substantially perpendicular to each other.

6. The apparatus of claim 1, wherein the first region and the second region alternate in a first direction, and
   wherein the first region comprises a first sub-pixel, a second sub-pixel, and a third sub-pixel emitting light of different colors and arranged in a second direction substantially perpendicular to the first direction.

7. A liquid crystal display apparatus comprising:
   a first substrate partitioned into a first region which displays an image and a second region through which external light passes;
   a second substrate facing the first substrate;
   a liquid crystal layer disposed between the first substrate and the second substrate;
   a first polarizer disposed on one side of the first substrate;
   a second polarizer disposed on one side of the second substrate, wherein at least one selected from the first polarizer and the second polarizer comprises an opening positioned in the second region;
   a first electrode and a second electrode which generate an electric field in the liquid crystal layer, wherein at least one selected from the first electrode and the second electrode is not in the second region,
   a color filter disposed between the first substrate and the liquid crystal layer and configured to assign a predetermined color to incident light;
   a black matrix partitioning the color filter,
   wherein the color filter and the black matrix are not in the second region and the color filter and the black matrix are disposed between the second electrode and the first polarizer; and
   wherein the first polarizer is disposed between the first substrate and the color filter, the first polarizer is disposed between the first substrate and the black matrix, and the second polarizer is disposed between the second substrate and the liquid crystal layer.

8. The apparatus of claim 7, wherein the second electrode is disposed in at least the first region on the first substrate, and the first electrode has a form of slits in the first region on the second electrode.

9. The apparatus of claim 7, wherein the first electrode is disposed in the first region on the first substrate, and the second electrode is disposed in at least the first region on a surface that faces the first substrate of the second substrate.

10. The apparatus of claim 1, further comprising a light guiding plate disposed on the opposite surface of a surface that faces the second substrate of the first substrate, and a light source configured to supply light to the light guiding plate.

11. The apparatus of claim 10, wherein the light source faces a side surface of the light guiding plate, and the light guiding plate comprises a material capable of transmitting light.

* * * * *